2,849,248
SELF-LATCHING COUPLING PIN

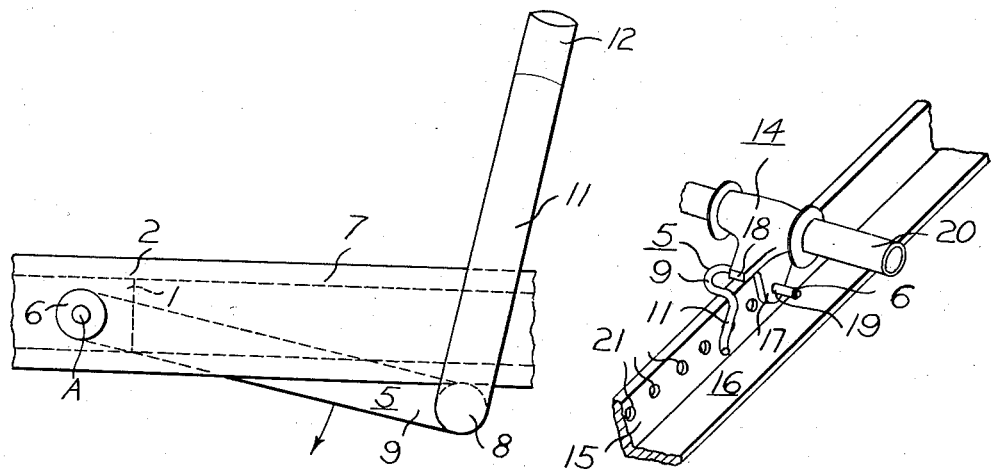
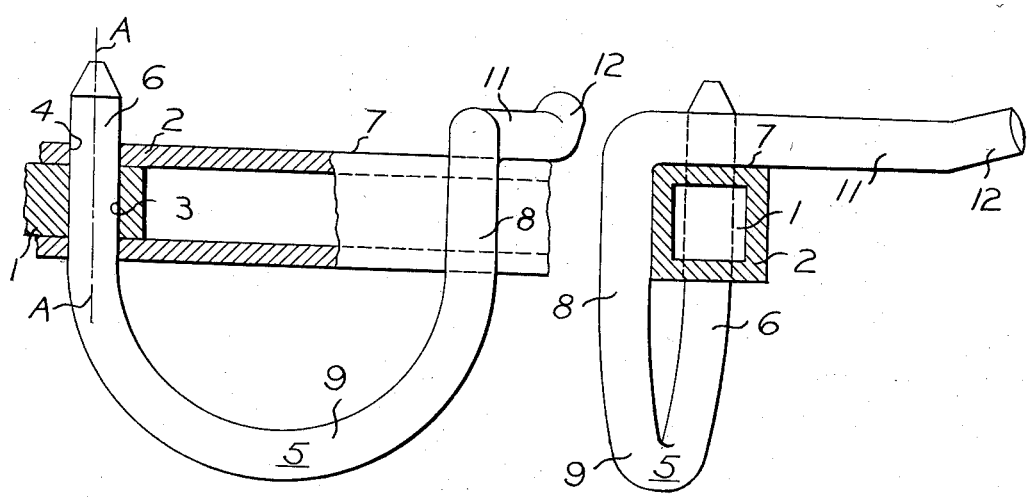

Lawrence E. Allen, Independence, Mo., assignor to Allis-Chalmers Manufacturing Company, Milwaukee, Wis.

Application September 1, 1955, Serial No. 531,887

1 Claim. (Cl. 287—58)

This invention is concerned with coupling pins for attaching a pair of members together. More particularly, the invention is concerned with a type of coupling pin which is readily inserted in coupling relation to the pair of members and yet will not work out of retaining position as a result of vibration.

An object of this invention is to provide a one-piece antiwithdrawal coupling pin.

A further object of this invention is to provide a one-piece coupling pin which is readily inserted into coupling relation and which can only be withdrawn by pivoting the coupling portion about its major axis prior to withdrawal.

A further object of this invention is to provide a one-piece coupling pin which resiliently resists withdrawal thereof from coupling relation to a pair of members.

These and other objects and advantages will become apparent as the description progresses and particularly points out other features not previously mentioned.

Accordingly, the invention may be considered as consisting of the various details of construction, correlation of features, arrangements of parts as are more fully set forth in the attached description and in the appended claim, reference being had to the accompanying drawing, in which:

Fig. 1 is a side elevation view of a coupling pin installation, partly in section;

Fig. 2 is a plan view of the coupling pin installation shown in Fig. 1;

Fig. 3 is an end view, partly in section, of the coupling pin installation shown in Fig. 1; and Fig. 4 is a perspective view showing a bearing member secured on an angle member by means of a coupling pin embodying the invention.

Referring to Fig. 1, it is seen that a second structural member 1 is telescopically received within a first tubular mounting member 2. These members 1 and 2 are provided with apertures 3 and 4, respectively, which are in registry. Received within apertures 3 and 4 is a pintle portion 6 of a one-piece coupling pin 5 which pintle portion partially extends beyond side 7 of mounting member 2. A stop shank portion 8 of the coupling pin 5 extends generally parallel in radially spaced and side opposed relation to pintle portion 6. As shown in Fig. 1 the pintle portion 6 and the stop shank portion 8 are joined at end portions thereof in side opposed relation to each other by an arcuately configured handle portion 9, which lies in a plane extending radially or at right angles to the axis of the pintle portion 6. A keeper portion 11 is attached at one end to the upper end of stop shank portion 8 and extends at generally right angles thereto in contacting relation to side 7 of mounting member 2.

The free end portion 12 (Figs. 1 and 3) of keeper portion 11 is bent over or out slightly to make it easier to operate the coupling pin as will be explained later.

As shown in Figs. 1 and 3, coupling pin 5 is connected in coupling relation with members 1 and 2, and rotatively adjusted within the registering apertures 3 and 4 to a position in which the stop shank 8 of the pin bears against the adjacent side of the mounting member 2. In this position of the pin 5 it cannot be withdrawn from engagement with members 1 and 2 without first pivoting coupling pin 5 approximately 45° in the direction of the arrow in Fig. 2 about the major axis A—A of the pintle portion 6. After this pivoting, the coupling pin can now be withdrawn by moving it vertically downward. Members 1 and 2 can now be horizontally slid apart.

Recoupling members 1 and 2 would involve just the recited steps in reverse. In other words, member 1 is telescopically slid into member 2 until the apertures in these members are in registry. Pintle portions 6 of coupling pin 5 is then slid into the apertures sufficiently so that upon a reverse pivoting movement of the coupling pin about axis A—A keeper portion 11 will slide along side 7 of member 2. The turned up end 12 acts as a cam follower during the initial part of such pivoting, and if the coupling pin has not been inserted quite deeply enough this cam follower coacting with the adjacent edge of surface 7 will cause the coupling pin to be pushed deeper into the apertures. In other words, turned up end 12 will contact the edge of side 7 and continued pivoting opposite to the arrow in Fig. 2 will cause a camming of the pintle portion 6 deeper into engagement with members 1 and 2 until pin 5 has been forced into a resiliently deflected condition by the camming action of end portion 12 on mounting member 2. Due to this deflected condition of the coupling pin as a whole, keeper portion 11 is restrained from moving over side 7 when gravity and/or vibration tend to rotate the pin in the direction of the arrow in Fig. 2.

While handle portion 9 has been shown as an arcuately shaped portion, the coupling pin 5 could function with handle portion 9 having a different configuration. However, the arcuate configuration does provide definite advantages. It provides a convenient and safe handle with which the coupling pin 5 can be grasped when inserting or removing same. In addition, the arcuate portion 9 (Fig. 1) adjacent the pintle portion 6 limits or serves as stop means to the penetration of the pin portion into the apertures of the members being connected, thereby making it easy to operate the coupling pin. For example, when inserting the coupling pin, the pin is inserted until the arcuate portion 9 limits further insertion. The pin is then pivoted about its major axis until the free end of turned over end 12 contacts or is in registry with the adjacent edge of side 7. Continued pivoting of pin 5 results in the aforementioned camming action between turned up end 12 and the edge of side 7 driving the pin portion slightly deeper into the apertures of the member until keeper portion 11 is resiliently contacting side 7 thereby preventing withdrawal of pin 5 without first pivoting same about its major axis. It will be appreciated that when the coupling pin is in an unlocked position the axial distance, taken along stop shank 8, between the keeper portion 11 and a plane extending at right angles to the pintle portion through said stop means, is less than the width of first member 2, so that when the stop means is in contact with the first member 2 the keeper portion 11 is in nonregistry with side 7 of first member 2. In this position the offset of turned over portion 12 is sufficient so that it is in registry with the side 7. As described above rotation of the coupling pin about the pintle portion 6 forces the portion 12 into a camming action which deflects the coupling pin sufficiently to bring the keeper portion into resilient contact with side 7 of the first member 2.

Fig. 4 shows a slightly different use which can be made of the herein disclosed one-piece, self-latching coupling pin. It is seen that coupling pin 5 can be utilized for coupling a bearing member 14 to a flange 15 of an angle member 16. Bearing member 14 is provided with a pair of depending ear members 17 (only one of which is shown) spaced apart by a tongue 18 extending at right angles thereto. The ears 17 are spaced apart substantially the thickness of flange 15 and these ears are provided with aligned apertures 19 therethrough. Bearing member 14 is shown in supporting relation to one end of a shaft 20. A similar bearing and angle member, not shown, may be provided to support the other end of shaft 20. Flange 15 of angle member 16 is provided with a series of apertures 21 which permit ready adjustment of bearing member 14 along angle member 16. To make any desired adjustment all that need be done is to select the position on angle member 16 where it is desired to have bearing member 14 positioned. The bearing member is then positioned with its ears 17 straddling flange 15 with tongue 18 contacting the upper surface of flange 15, and with the apertures 19 in registry with a desired aperture 21 in flange 15. Pintle portion 6 is then inserted through the registering apertures and the pin 5 is pivoted until keeper portion 11 is in the position shown in Fig. 4.

It is not intended to limit the invention to the exact construction herein shown and described for purposes of illustration, as various modifications within the scope of the appended claim may occur to persons skilled in the art.

It is claimed and desired to secure by Letters Patent:

The combination comprising, a first member received about a second member, said members being provided with registering apertures, a coupling pin received in said registering apertures and including a pintle portion having one end extending beyond one side of said first member, a stop shank portion extending alongside said members in generally radially spaced parallel relation to said pintle portion and having one end extending beyond said one side of said first member, a handle portion joining the other end of said pintle portion with the other end of said stop shank portion, stop means on said handle portion contacting said first member and limiting insertion of said pintle portion into said apertures, and a keeper portion extending at generally a right angle from said one end of said stop shank portion, the axial distance along said stop shank between said keeper portion and a plane extending at right angles to said pintle portion through said stop means being less than the width of said first member so that when said stop means on said handle portion is in contact with said first member said keeper portion is in nonregistry with said one side of said first member, and a turned out end portion provided on said keeper portion and having the free end thereof in registry with said one side of said first membr so that as said coupling member is pivoted about said pintle portion into a locked position said turned out end portion will be forced into camming relation with said one side thereby deflecting said coupling pin and bringing said keeper portion into resilient contact with said one side of said first member.

References Cited in the file of this patent

UNITED STATES PATENTS

| | | |
|---|---|---|
| 726,829 | Schweigerer | Apr. 28, 1903 |
| 778,412 | Hartz | Dec. 27, 1904 |
| 1,212,868 | Wohlford | Jan. 16, 1917 |